Dec. 19, 1967 W. C. HYND 3,359,090
HOMOGENISATION OF MOLTEN GLASS WITH A FLOW SEPARATOR
Filed July 24, 1964
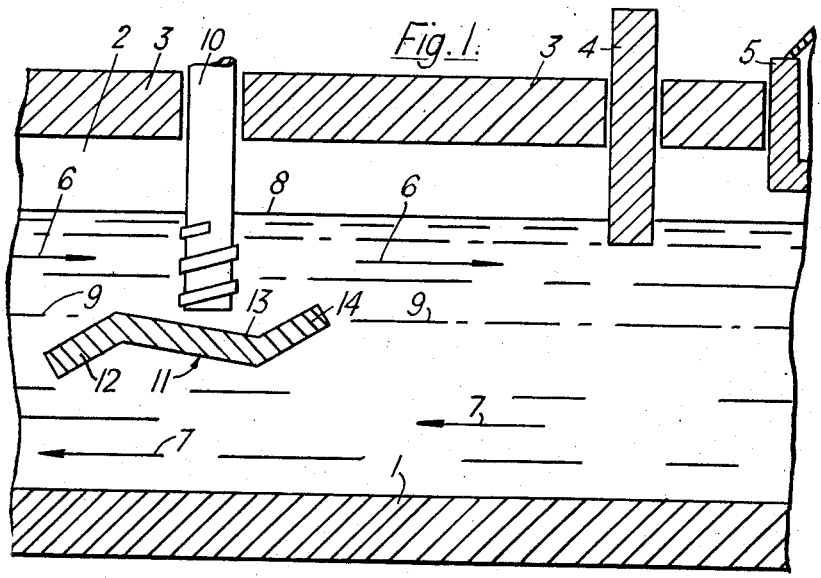
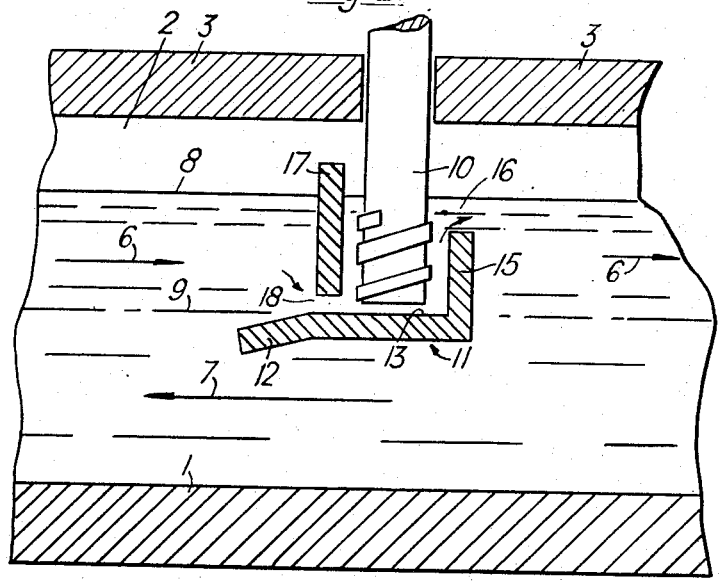

United States Patent Office 3,359,090
Patented Dec. 19, 1967

3,359,090
HOMOGENISATION OF MOLTEN GLASS WITH A FLOW SEPARATOR
William Christie Hynd, Liverpool, England, assignor to Pilkington Brothers Limited, Liverpool, England, a corporation of Great Britain
Filed July 24, 1964, Ser. No. 384,932
Claims priority, application Great Britain, July 29, 1963, 30,046/63
4 Claims. (Cl. 65—178)

ABSTRACT OF THE DISCLOSURE

In the manufacture of glass in which a forward flow of molten glass takes place over a return flow of cooled molten glass; the segregation of the two glass flows by a bridge extending across the width of the glass flows.

---

This invention relates to the homogenisation of molten glass, and in particular to the homogenisation of a forward flow of molten glass in conditions in a glass manufacturing process in which a forward flow of molten glass takes place over a return flow of cooled molten glass.

A flow pattern of this kind occurs in several glass manufacturing processes, for example in the waist of a glass melting furnace between the melting zone and the fining zone of the furnace, and in the canal connecting a glass melting tank to a drawing kiln from which glass in sheet form is vertically drawn. Stirring has not normally been successful where there is such a flow pattern, because it would be detrimental to the glass produced to cause any interference betwen the forward and return flows.

It is a main object of the present invention to provide an improved method of manufacturing glass in which a forward flow of homogeneous molten glass is obtained without causing interchange of molten glass between the forward and return flows.

According to the invention a method of manufacturing glass in which a forward flow of molten glass takes place over a return flow of cooled molten glass, characterised by agitating one of said flows of molten glass while segregating the two glass flows in the region where agitation takes place in order to minimise interchange of molten glass between the glass flows in that region.

According to a preferred method of operating the invention the forward flow is agitated and the forward flow is segregated from the return flow in the region where agitation takes place, in order to minimise interchange of molten glass between the forward and return flows in that region.

The forwardly flowing molten glass may be agitated by bubbling a gas through the forward flow, but preferably according to the invention the forward flow is agitated by stirring. Agitation of the forward flow may also be effected by causing an upward flow of molten glass from an electrically heated metallic grid immersed in the forward flow.

In one application of the invention a homogeneous flow of molten glass is provided from the melting zone to the fining zone of a glass melting furnace by stirring the forward flow of molten glass from the melting zone into the fining zone, and positioning a dividing surface in the molten glass in the stirring region at the level of the neutral plane between said forward flow and the return flow of cooled molten glass from the fining zone to the melting zone, to minimise or prevent any interchange of molten glass occasioned by the stirring between the forward flow and the return flow.

The method of the invention can also be employed in processes for drawing sheet glass. In such processes one or more drawing kilns are connected to a glass melting tank by canals through each of which there is a return flow of cooled molten glass from the kiln to the melting tank. Accordingly, the invention also provides a method of providing a flow of homogeneous glass to a drawing kiln from which glass in sheet form is vertically drawn, characterised by stirring the forward flow of molten glass into the kiln, and positioning a dividing surface in the molten glass at the level of the neutral plane between the forward and return flows of molten glass in the stirring region, to minimise or prevent any interchange of molten glass occasioned by the stirring between the forward flow and the return flow.

A single bank of stirrers may be located in the forward flow. However, according to the invention the efficiency of stirring may be improved by localising the stirring action in the forward flow of molten glass.

The invention also comprehends apparatus for manufacturing glass by a method as set out above, including a channel adapted for conducting a forward flow of molten glass over a return flow at the bottom of the channel, a bank of stirrers positioned across the upper part of that channel for stirring the forward flow, and a dividing vane mounted between the side walls of the channel underneath the stirrers and positioned so that it segregates the forward flow from the return flow in the region of the stirrers.

In one application of the invention the channel is constituted by the waist of a glass melting furnace between the melting zone and the fining zone of the furnace.

In another application of the invention to apparatus for the vertical drawing of sheet glass, the apparatus includes a drawing kiln from which sheet glass is vertically drawn, said channel being connected to the drawing kiln.

Preferably, the dividing vane is of streamlined shape and the stirrers are helical stirrers which produce a downward movement of molten glass on to the upper surface of the vane, which downward movement is deflected upwardly by the vane into the general direction of the forward flow of molten glass along the channel downstream of the stirrers.

Further according to the invention, for localising the stirring action the vane includes a vertical wall extending upwardly from the downstream edge of the vane, and a barrier wall extending across the channel is positioned at the upstream side of the stirrers, the bottom of said barrier wall being vertically spaced above the vane to provide an inlet for the forward flow of molten glass into the stirring chamber so defined.

Since the dividing vane is at the temperature of molten glass throughout its working life it is made of refractory material. In order to simplify the mounting of the vane and to prevent it from being unduly stressed when it is submerged in molten glass, the dividing vane is preferably a hollow bridge of refractory material encased in a skin of refractory metal and so formed that the specific gravity of the vane is of the same order as that of molten glass.

Desirably the refractory metal is selected from the group comprising molybdenum, platinum and alloys of molybdenum or platinum which are resistant to attack by molten glass.

In order that the invention may be more clearly understood some embodiments thereof will now be described, by way of example, with reference to the accompanying diagrammatic drawings in which:

FIGURE 1 is an elevation partly in section showing a canal connecting a glass melting tank to a drawing kiln, with apparatus according to the invention located in the canal, and FIGURE 2 is a view similar to FIGURE 1 showing a modification of the apparatus for improving the efficiency of stirring.

Referring to the drawings, FIGURE 1 shows a canal consisting of a floor 1 and side walls 2 leading from a glass melting tank, not shown, to a drawing kiln. The canal has a roof 3, through which depends a shut-off gate 4. One of the L-blocks of a drawing kiln of known kind, which L-blocks define a chamber through which a sheet of glass is vertically drawn, is indicated at 5.

The canal forms an extension of the melting tank and as is customary there is a forward flow of molten glass, indicated by the arrow 6 along the upper part of the canal, and a return flow of cooled molten glass, which may be contaminated with bubbles or other products arising from contact with the refractory, along the bottom of the canal from the drawing kiln back to the melting tank. This return flow is indicated at 7 in FIGURE 1. The level of the surface of the forward flow is indicated at 8, and there is a neutral plane 9 in the molten glass where the velocity of the molten glass is zero.

A bank of stirrers 10 is mounted in the roof 3 and the stirrers are spaced side-by-side across the canal. Only one stirrer of helical form is shown in FIGURE 1, but in a practical embodiment of the invention there may be, for example, sixteen stirrers equispaced across a 12 foot canal. Also the stirrers 10 may be of any suitable form, for example straight-stalk stirrers of cylindrical form may be employed. In the embodiment illustrated the stirrers are so arranged that their lower ends are some way above the neutral plane 9, so that the stirrers 10 are positioned in the forward flow 6 only.

A dividing vane 11 is mounted between the side walls 2. The vane is in the form of a horizontal bridge of generally rectangular shape, but the leading edge 12 of the vane is tilted downwardly so that it slopes slightly into the return flow 7 of molten glass.

The upper surface 13 of the central part of the vane 11 lies generally in the neutral plane 9, although it has a slight downward slope in the downstream direction of the forward flow 6. The downstream edge 14 of the vane is tilted upwardly into the forward flow 6 downstream of the stirrers.

That is the vane 11 has a streamlined shape and does not itself cause intermixing of the forward and return flows. When the stirrers 10 rotate in the forward flow 6 of molten glass they may produce a downward movement of molten glass into the region of the neutral plane 9, especially when helical stirrers are used. Any downward flow of glass on to the upper surface 13 of the vane 11 is deflected upwardly by the vane edge 14 into the general direction of the forward flow of molten glass into the drawing chamber.

The stirring of the forward flow thus produces a flow of homogeneous glass to the kiln and the presence of the dividing vane minimises or prevents any downward movement of molten glass from the forward flow 6 into the return flow 7, or any upward movement of cooled glass from the return flow into the forward flow. The required forward flow of homogeneous glass is thus provided without interference with the pattern of forward and return flow in the canal, because the forward flow is segregated from the return flow in the region of the stirrers.

Greater efficiency of stirring in the forward flow is achieved, according to the invention, by localizing the stirring action of the bank of stirrers 10. This is illustrated in FIGURE 2.

The forward flow of glass 6 is constrained to pass through an enclosed stirring chamber, which chamber is defined between barrier walls positioned upstream and downstream of the bank of stirrers. One of these barrier walls is a vertical wall 15 extending upwardly from, and integral with, the downstream edge 14 of the dividing vane 11. There is a space 16 between the top of the wall 15 and the surface 8 of the molten glass.

A barrier wall 17 is positioned at the upstream side of the stirrers and extends between the side walls 2. The top of the wall 17 rises above the surface level 8 of the glass, and the bottom of the wall is vertically spaced above the vane 11 to define an inlet 18 for the forward flow of molten glass into the stirring chamber. The inlet 18 is located just above the level of the neutral plane 9. The stirrers 10 in this chamber have an impeller action and are so controlled that just the right amount of glass for the forward flow is pulled through the inlet 18 to the chamber.

As in the FIGURE 1 construction the leading edge 12 of the vane 11 slopes downwardly and this stream-lining ensures that all the forward flow of molten glass in the canal enters the inlet 18 and is impelled through the stirring chamber. The flow of homogeneous molten glass leaves the stirring chamber through the outlet 16 defined above the top of the wall 15.

The vane 11 is constructed of refractory material and in order to avoid contamination of the molten glass during its contact with the vane, the vane is provided with a skin of a metal which is resistant to attack by molten glass. Preferably the metal skin is a skin of molybdenum or platinum, or an alloy of either of these metals which is resistant to molten glass.

Lugs are provided in the side walls 2 for locating the vane 11, and the barrier wall 17. They each comprise a hollow body of refractory material encased with a metal skin as described above. Preferred materials for the vane 11 and the barrier wall 17 are alumino-siliceous fireclays, fused silica materials and electro-cast corundum/zirconia materials.

The hollow refractory body is formed with one or more internal cavities, so that the composite vane 11 and the barrier wall 17 each have an effective specific gravity of the same order as the molten glass in which they are immersed. There is thus very little strain in the vane and the barrier wall due to their buoyancy in the molten glass and they can be accurately located between the side walls 2 without any bending or sagging in the middle. This is a considerable advantage since it is important to ensure that the upper surface 13 of the vane 11 remains throughout its length as nearly as possible in the neutral plane 9.

It will be understood that the flow segregating apparatus described above, or the localised stirring apparatus may be employed in other glass making processes and apparatus in which a flow of homogeneous molten glass is required.

According to another modification of the invention the stirrers 10 may be replaced by an arrangement for bubbling gas into the forward flow 6 of molten glass in order to homogenise the glass in the forward flow. In this embodiment of the invention a tube or tubes having a plurality of outlets is/are mounted on the vane just above its upper surface 13, and arrangements for supplying the tube or tubes with a gas under pressure are built into the vane. Gas escaping the holes in the tube or tubes agitates the forward flow of molten glass to homogenise the glass above the vane without interfering with the return flow.

The stirrers 10 in the embodiment of FIGURE 2 may also be replaced by gas bubbling arrangements mounted on the top of the vane, so that there is localized agitation of the molten glass to homogenise it in the chamber defined between the walls 15 and 17, and a forward flow of homogeneous glass emerges over the top of the wall 15.

Further, because the return flow is segregated from the forward flow, the return flow may be stirred, if desired, without any appreciable mixing of cooled molten glass from the return flow into the forward flow.

In another application the invention may be employed for agitating the forward flow of molten glass which takes place over a return flow of cooled molten glass at the waist of a glass melting furnace between the melting zone of the furnace and the fining zone of the furnace.

I claim:
1. Glass manufacturing apparatus including a channel for conducting an upper forward flow of molten glass over a return flow at the bottom of the channel, and an agitating means positioned across the upper part of that channel for agitating said upper forward flow, wherein there is provided a dividing vane mounted between the side walls of the channel underneath the agitating means and extending across the whole width of the channel between the forward flow and the return flow in the region of the agitating means.

2. Apparatus according to claim 1, wherein the dividing vane has a contour extending generally longitudinally of the channel.

3. Apparatus according to claim 1, wherein the agitating means are helical stirrers which produce a downward movement of molten glass on to the upper surface of the vane, and wherein the vane has a surface with an upward component whereby downward movement is deflected upwardly by the vane into the general direction of the forward flow of molten glass along the channel downstream of the stirrers.

4. Apparatus according to claim 1, wherein the vane includes a vertical wall extending upwardly from the downstream edge of the vane, and a barrier wall extending across the channel is positioned at the upstream side of the agitating means, the bottom of said barrier wall being vertically spaced above the vane to provide an inlet for the forward flow of molten glass into the agitating chamber so defined.

References Cited
FOREIGN PATENTS
626,920   5/1963   Belgium.

DONALD H. SYLVESTER, *Primary Examiner.*

F. W. MIGA, *Assistant Examiner.*